US008773645B2

(12) United States Patent
Ogino

(10) Patent No.: US 8,773,645 B2
(45) Date of Patent: Jul. 8, 2014

(54) DISTANCE MEASURING DEVICE AND IMAGING DEVICE

(75) Inventor: Yasushi Ogino, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/318,953

(22) PCT Filed: May 6, 2010

(86) PCT No.: PCT/JP2010/003110
§ 371 (c)(1),
(2), (4) Date: Jan. 25, 2012

(87) PCT Pub. No.: WO2010/131436
PCT Pub. Date: Nov. 18, 2010

(65) Prior Publication Data
US 2012/0120383 A1    May 17, 2012

(30) Foreign Application Priority Data

May 15, 2009    (JP) .................................. 2009-118512

(51) Int. Cl.
*G01C 3/08*    (2006.01)
(52) U.S. Cl.
USPC ........................................ 356/4.03; 356/4.04
(58) Field of Classification Search
USPC .............................................. 356/4.03, 4.04
See application file for complete search history.

(56) References Cited

U.S. PATENT DOCUMENTS

| 4,223,988 | A | * | 9/1980 | Jyojiki et al. | ................. | 396/112 |
| 5,160,834 | A | * | 11/1992 | Moriyama | ................. | 250/201.8 |
| 6,496,225 | B1 | * | 12/2002 | Higashihara et al. | ......... | 348/345 |
| 6,597,868 | B2 | * | 7/2003 | Suda | ............................. | 396/111 |
| 6,700,615 | B1 | * | 3/2004 | Satoh | ............................ | 348/345 |
| 6,768,867 | B2 | * | 7/2004 | Kindaichi et al. | ............ | 396/100 |
| 6,933,978 | B1 | * | 8/2005 | Suda | ............................. | 348/345 |
| 7,196,847 | B2 | * | 3/2007 | Ye | ............................. | 359/484.06 |
| 7,326,451 | B2 | * | 2/2008 | Takeda et al. | ................ | 428/1.31 |

(Continued)

FOREIGN PATENT DOCUMENTS

JP    A-05-174397    7/1993
JP    A-06-292092    10/1994

(Continued)

OTHER PUBLICATIONS

International Search Report in International Application No. PCT/JP2010/003110; dated Jul. 6, 2010 (with English-language translation).

(Continued)

*Primary Examiner* — Isam Alsomiri
*Assistant Examiner* — Assres H Woldemaryam
(74) *Attorney, Agent, or Firm* — Oliff PLC

(57) ABSTRACT

A distance measuring device including a polarizing element disposed on a plane conjugate with a pupil of an objective lens, an optical rotatory plate rotating a polarizing axis of light which has passed through the polarizing element, a polarization separation element separating light which has passed through the optical rotatory plate into a first light beam and a second light beam, a first imaging element forming a first image by the first light beam, a second imaging element forming a second image by the second light beam, and a focus detector detecting a focus state based on relative deviation between the first image and the second image which correspond to a same region of a subject.

12 Claims, 11 Drawing Sheets

(56) References Cited

U.S. PATENT DOCUMENTS

| | | | |
|---|---|---|---|
| 7,358,999 B2 * | 4/2008 | Ikeda | 348/349 |
| 7,515,819 B2 * | 4/2009 | Takahashi | 396/121 |
| 7,616,878 B2 * | 11/2009 | Takamiya | 396/111 |
| 8,150,254 B2 * | 4/2012 | Kikuchi et al. | 396/95 |
| 8,159,599 B2 * | 4/2012 | Takamiya | 348/345 |
| 8,189,091 B2 * | 5/2012 | Higuchi | 348/349 |
| 2004/0036838 A1 * | 2/2004 | Podoleanu et al. | 351/206 |
| 2006/0056029 A1 * | 3/2006 | Ye | 359/578 |
| 2006/0120710 A1 | 6/2006 | Nagano et al. | |
| 2008/0192457 A1 * | 8/2008 | Krijn et al. | 362/19 |

FOREIGN PATENT DOCUMENTS

| | | |
|---|---|---|
| JP | A-11-202193 | 7/1999 |
| JP | A-11-223760 | 8/1999 |
| JP | A-2000-330012 | 11/2000 |
| JP | A-2006-064969 | 3/2006 |
| JP | A-2006-106435 | 4/2006 |
| JP | A-2008-015157 | 1/2008 |
| JP | A-2008-145889 | 6/2008 |

OTHER PUBLICATIONS

International Preliminary Report on Patentability in International Application No. PCT/JP2010/003110; dated Nov. 15, 2011 (with English-language translation).

Jan. 7, 2014 Notification of Reasons for Refusal issued in Japanese Patent Application No. 2010-106375 (with translation).

* cited by examiner

Fig.10
(a)
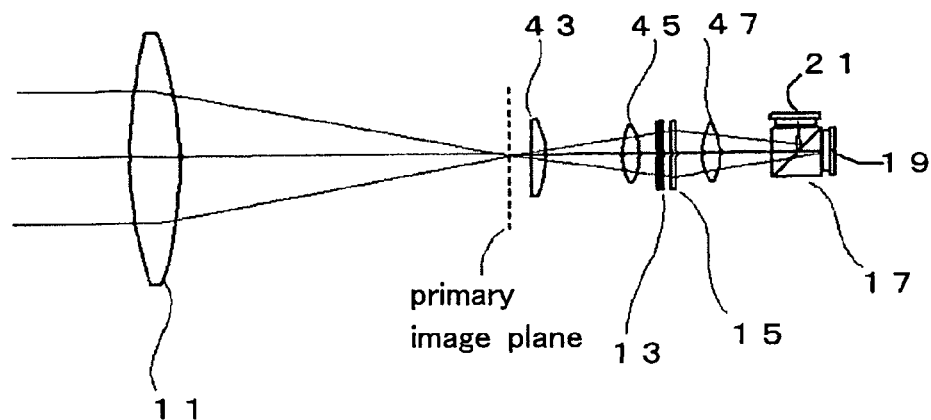
primary image plane
(b)
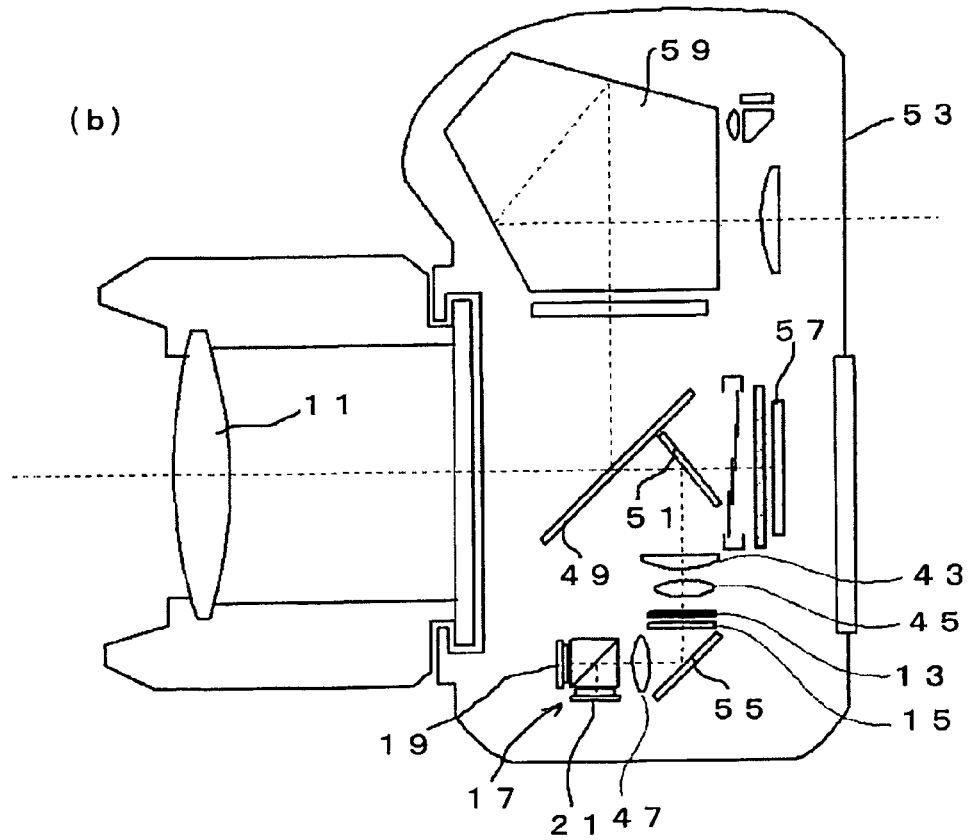

Fig.11
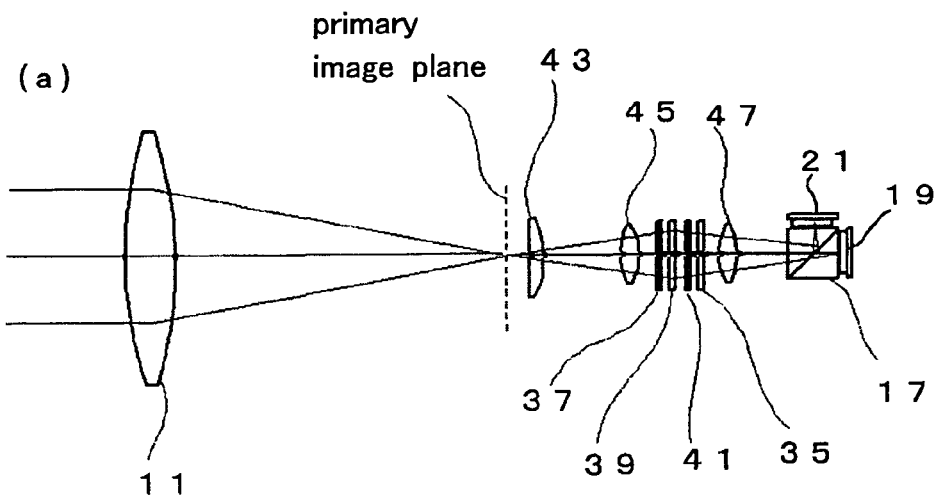
(a)
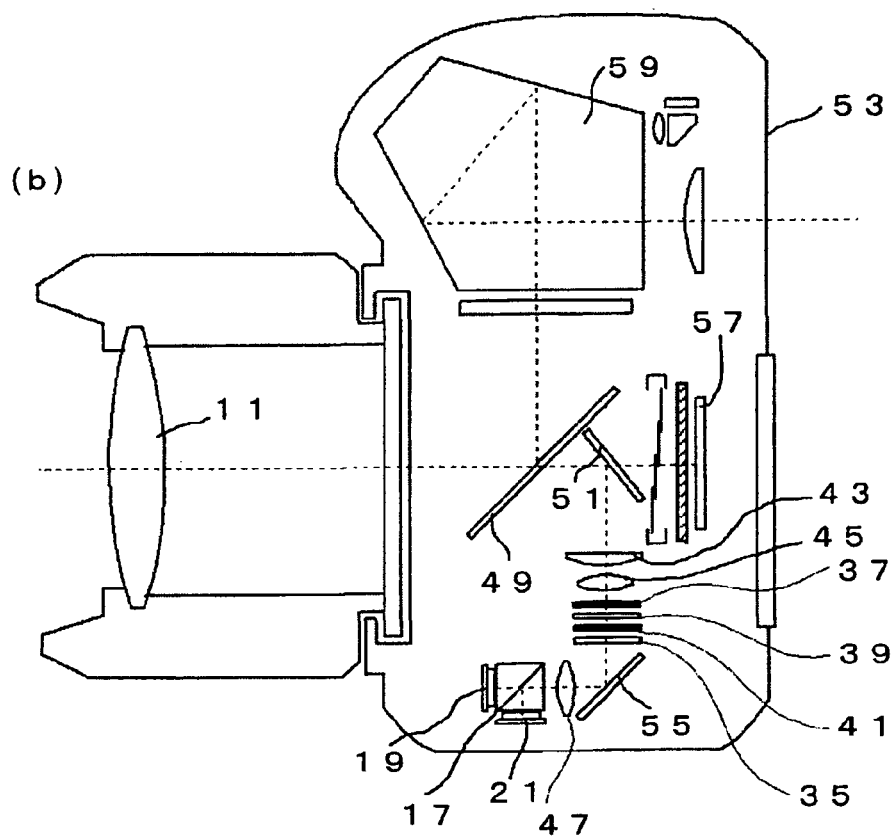
(b)

DISTANCE MEASURING DEVICE AND IMAGING DEVICE

CROSS-REFERENCE TO RELATED APPLICATION

This application is a U.S. National Stage application claiming the benefit of prior filed International Application Number PCT/JP2010/003110, filed May 6, 2010, in which the International Application claims a priority date of May 15, 2009, based on prior filed Japanese Application Number 2009-118512, the entire contents of which are incorporated herein by reference.

TECHNICAL FIELD

The present application relates to a distance measuring device and an imaging device.

BACKGROUND ART

Conventionally, there has been known an optical apparatus performing focus detection of an imaging optics by a pupil division method (see, for example, Patent Document 1).

In the above-described apparatus, an electro-optic element composed of the combination of a grating and liquid crystal is inserted on a pupil plane of the imaging optics, and lights that have passed through different regions in an exit pupil are polarized in different directions. Then, beams of the lights are imaged on different regions of an imaging element capturing images of the imaging optics, and phase difference AF is performed based on image data thereof.

Patent Document 1: Japanese Unexamined Patent Application Publication No. 2006-106435

SUMMARY OF THE INVENTION

Problems to be Solved

However, in the above-described conventional apparatus, when pupil division is performed by polarization and phase difference detection is performed, a fixed pupil shielding member is used for the pupil division, which had a problem of a low degree of freedom because distance measurement according to an F-number and performance requirement of a lens is not possible.

The present application was made to solve the above conventional problem, and a proposition thereof is to provide a distance measuring device and an imaging device capable of enhancing a degree of freedom in setting pupil division regions.

Means for Solving the Problems

A distance measuring device including a polarizing element disposed on a plane conjugate with a pupil of an objective lens, an optical rotatory plate rotating a polarizing axis of light which has passed through the polarizing element, a polarization separation element separating light which has passed through the optical rotatory plate into a first light beam and a second light beam, a first imaging element forming a first image by the first light beam, a second imaging element forming a second image by the second light beam, and a focus detector detecting a focus state based on relative deviation between the first image and the second image which correspond to a same region of a subject.

Preferably, the optical rotatory plate is divided into at least four regions radially with respect to an optical axis, and each of the regions is independently drivable.

Preferably, the optical rotatory plate is four-divided crisscross with respect to the optical axis.

Further, a distance measuring device including a first and a second polarizing element which are disposed on planes conjugate with a pupil of an objective lens and whose polarizing axes are perpendicular to each other, a first optical rotatory plate disposed between the first polarizing element and the second polarizing element to rotate a polarizing axis of light which has passed through the first polarizing element, a second optical rotatory plate rotating a polarizing axis of light which has passed through the second polarizing element, a polarization separation element separating light which has passed through the second optical rotatory plate into a first light beam and a second light beam, a first imaging element forming a first image by the first light beam, a second imaging element forming a second image by the second light beam, and a focus detector detecting a focus state based on relative deviation between the first image and the second image which correspond to a same region of a subject.

In this case, preferably, the second optical rotatory plate adjusts an optical rotatory state so as to cause lights from two transmission regions of the first optical rotatory plate to have polarizing axes perpendicular to each other.

Preferably, the distance measuring device further includes a mode for complete light shielding without performing an optical rotation by the first optical rotatory plate.

Preferably, the distance measuring device further includes a mode to perform the optical rotation by an arbitrary angle on whole surfaces of the transmission regions.

Preferably, the first optical rotatory plate has transmission regions in a dot matrix form.

Further, an imaging device including any one of the distance measuring devices having the above-described structures.

Effect

In the present embodiment, it is possible to enhance a degree of freedom in setting pupil division regions.

BRIEF DESCRIPTION OF THE DRAWINGS

FIG. 10 are explanatory views illustrating a fourth embodiment of the imaging device.

FIG. 11 is an explanatory view illustrating a fifth embodiment of the imaging device.

DETAILED DESCRIPTION OF THE EMBODIMENTS

Hereinafter, embodiments of the present invention will be described in detail by using the drawings.

First Embodiment

Figure 1:
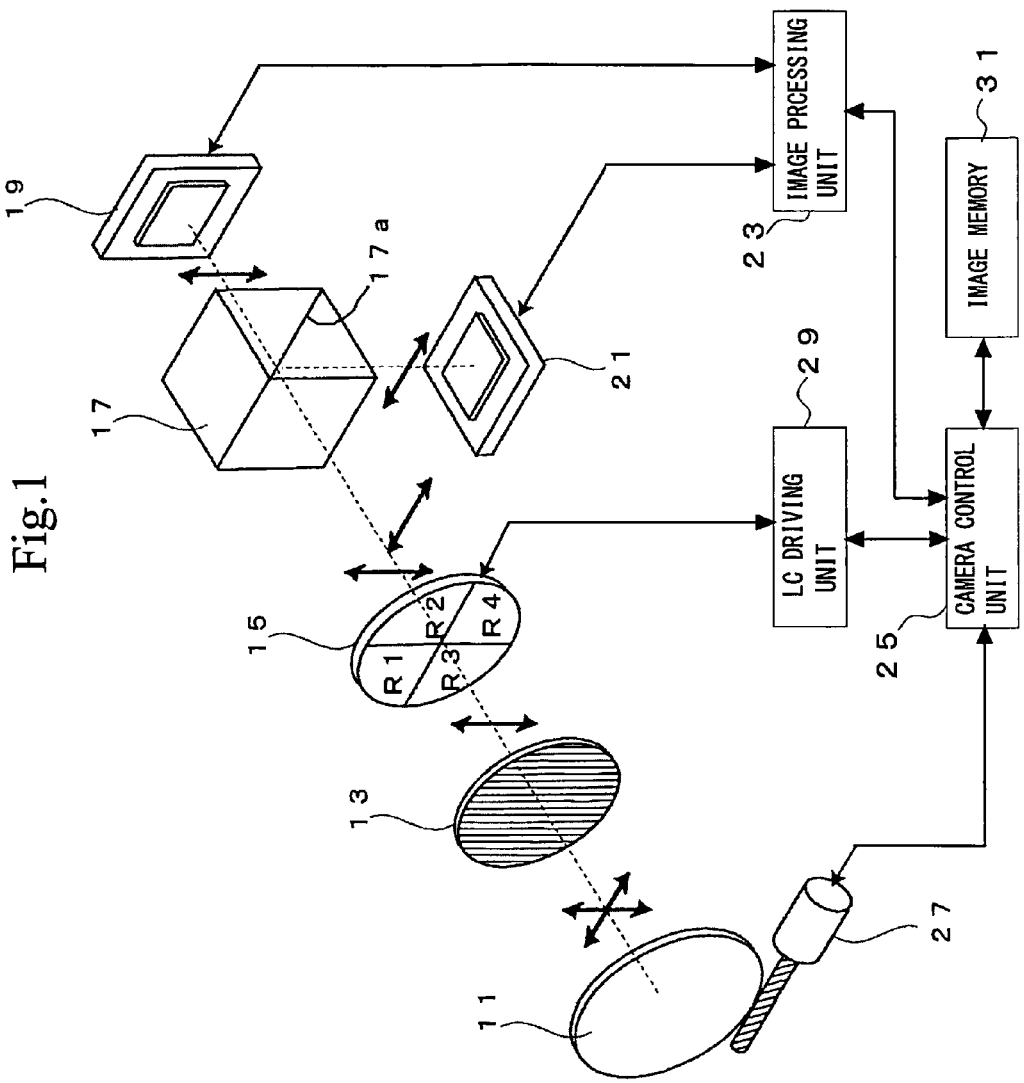
FIG. 1 is an explanatory view illustrating a first embodiment of an imaging device.

FIG. 1 illustrates a first embodiment of a distance measuring device of the present invention. In this embodiment, the present invention is applied to an imaging device being a camera.

The imaging device includes an objective lens 11, a polarizing element 13, a LC optical rotatory plate 15, a polarization separation element 17, a first imaging element 19, a second imaging element 21, an image processing unit 23, a camera control unit 25, an AF driving mechanism 27, a LC driving unit 29, and an image memory 31.

At a pupil position of the objective lens 11, the polarizing element 13 is provided. The polarizing element 13 includes a polarizing filter and aligns lights from the objective lens 11 so that they have P-polarizing axes, for instance.

Figure 2:
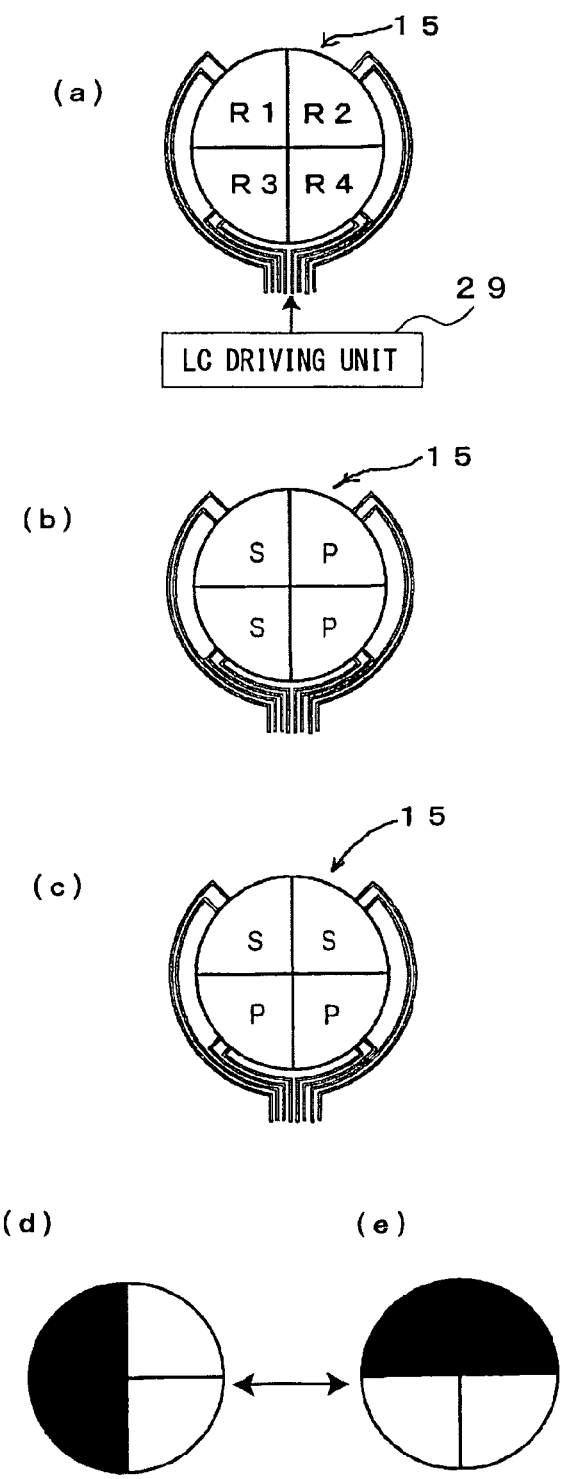
FIG. 2 are explanatory views illustrating details of a LC optical rotatory plate.

The LC optical rotatory plate 15 electrically changes the polarizing axes of the lights. As illustrated in FIG. 2(a), a light transmission surface of the LC optical rotatory plate 15 is divided into regions R1, R2, R3, R4 resulting from four-division along perpendicular lines with respect to an optical axis. Each of the regions R1, R2, R3, R4 is independently drivable by the driving of the LC driving unit 29. For example, when the P-polarized lights are incident from the polarizing element 13, the driving is performed so that the P-polarized lights incident on the left regions R1, R3 of the optical axis become S-polarized lights, and the P-polarized lights incident on the right regions R2, R4 are transmitted as they are, as illustrated in FIG. 2(b). Further, the driving is performed so that the P-polarized lights incident on the regions R1, R2 on the upper side of the optical axis become S-polarized lights, and the P-polarized lights incident on the lower regions R3, R4 are transmitted as they are, as illustrated in, for example, FIG. 2(c).

The polarization separation element 17 transmits, for example, the P-polarized lights from the LC optical rotatory plate 15 via a polarization separation plane 17a so that they are imaged on the first imaging element 19. FIG. 2(d) illustrates an image on the first imaging element 19 when the LC optical rotatory plate 15 is controlled as in FIG. 2(b). Only the right images being the P-polarized lights are imaged. FIG. 2(e) illustrates an image on the first imaging element 19 when the LC optical rotatory plate 15 is controlled as in FIG. 2(c). Only the lower images being the P-polarized lights are imaged. On the other hand, the polarization separation element 17 reflects the S-polarized lights on the polarization separation plane 17a so that the S-polarized lights are imaged on the second imaging element 21. Therefore, the image on the second imaging element 21 is an image in a laterally reversed state from the image in FIG. 2(d). Further, it is an image in a vertically reversed state from the image in FIG. 2(e).

The first imaging element 19 and the second imaging element 21 are disposed at optically equivalent positions, and when an in-focus image is formed on the first imaging element 19, an in-focus image is also formed on the second imaging element 21. As the first imaging element 19 and the second imaging element 21, CCDs each having two-dimensionally arranged light-receiving elements are used, for instance.

In the above-described imaging device, outputs of the first imaging element 19 and the second imaging element 21 are sent to the image processing unit 23 to undergo image processing such as A/D conversion and color processing. Further, in the image processing unit 23, based on image data obtained from the outputs of the first imaging element 19 and the second imaging element 21, calculation regarding focus detection is performed. The camera control unit 25 controls the driving of the AF driving mechanism 27 based on a focus detection calculation value calculated by the image processing unit 23 to adjust a focus of the objective lens 11. Further, the camera control unit 25 controls the whole camera. The image data obtained in the image processing unit 23 are recorded in the image memory 31.

Figure 3:
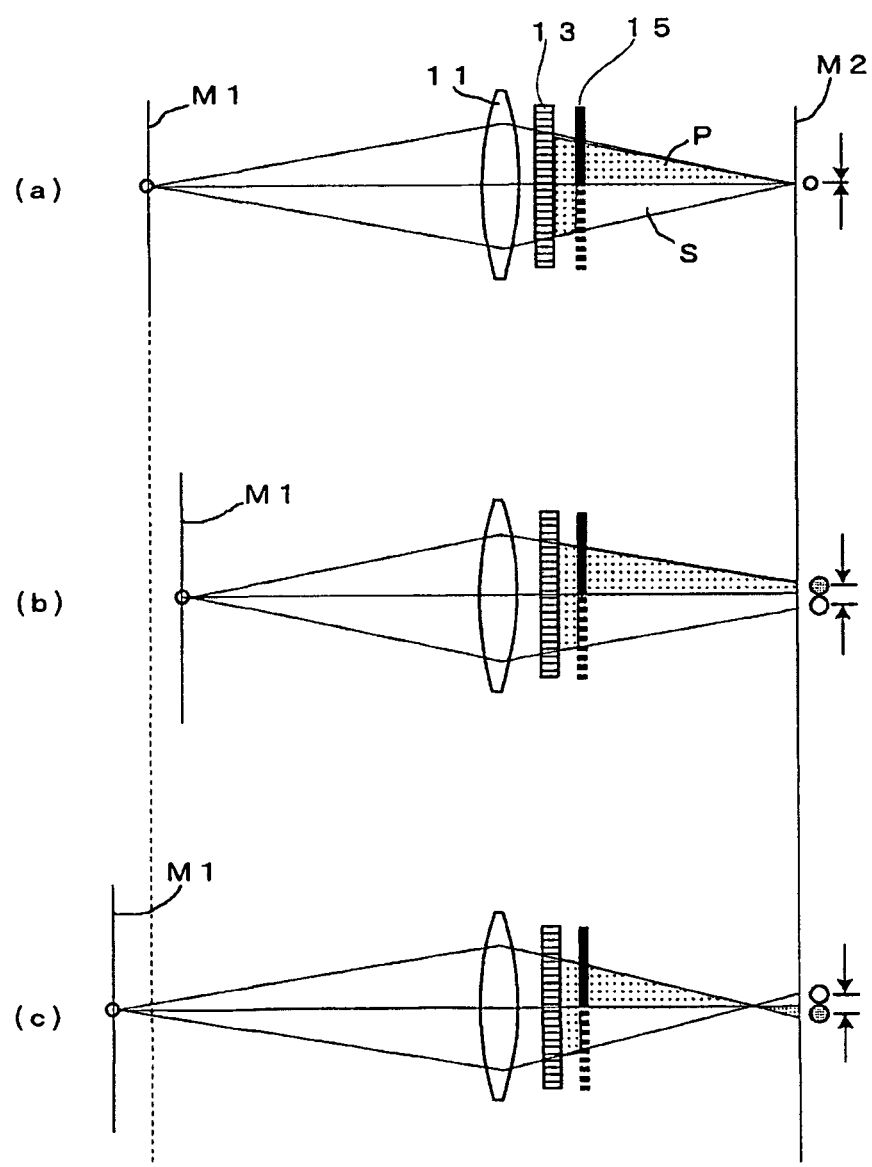
FIG. 3 are explanatory views illustrating a principle of distance measurement.

FIG. 3 illustrate a principle of a focus detection method in the above-described imaging device.

Light beams emitted from an object surface M1 are imaged by the objective lens 11. When the light beams are incident on the polarizing element 13 via the objective lens 11, they are aligned to, for example, P-polarized lights by the polarizing element 13. The light beams that have passed through the polarizing element 13 are brought into a polarization state as illustrated in, for example, FIG. 2(b) by the LC optical rotatory plate 15. The P-polarized lights in FIG. 2(b) are transmitted through the polarization separation plane 17a of the polarization separation element 17 to be imaged near an image plane M2 of the first imaging element 19. On the other hand, the S-polarized lights are reflected on the polarization separation plane 17a to be imaged near an image plane M2 of the second imaging element 21.

FIG. 3(a) illustrates an in-focus state, and an image by the P-polarized lights and an image by the S-polarized lights are both formed on the image plane M2 and at the same position. That is, when the image on the first imaging element 19 and the image on the second imaging element 21 are stacked, their image locations are the same. FIG. 3(b) illustrates a forward defocused state. Since the image location is located posterior to the image plane M2, an image on the image plane M2 is blurred, and the positions of the images by the P-polarized lights and the S-polarized lights are deviated. The image by the P-polarized lights is deviated upward from the optical axis and the image by the S-polarized lights is deviated downward from the optical axis. FIG. 3(c) illustrates a backward defocused state. The image by the P-polarized lights is deviated downward from the optical axis and the image by the S-polarized lights is deviated upward from the optical axis.

BY thus separating polarization components coming from the LC optical rotatory plate 15 in the polarization separation element 17, obtaining images of the respective polarization components by imaging the polarization components on the first imaging element 19 and the second imaging element 21, and comparing a phase difference between pictures in the two images, it is possible to calculate a defocus amount in the same manner as in normal phase difference AF. Further, by generating images based on the image data of the first imaging element 19 and the second imaging element 21, it is possible to obtain a photographed image of a subject.

In the imaging device of this embodiment, the LC optical rotatory plate 15 is divided into the plural regions R1, R2, R3, R4, and the polarizing axes of the polarized lights passing through the respective regions R1, R2, R3, R4 are freely settable, which can enhance a degree of freedom in setting pupil division regions.

Since the polarization state, that is, the shielding state of the LC optical rotatory plate 15 can be electrically changed, it is possible to instantaneously change a direction of a base length of the phase difference AF. This enables the distance measurement even when a subject has, for example, only vertical and lateral patterns, by the base lengths in two perpendicular directions, which enables the accurate distance measurement for subjects with various patterns. For example, when a pattern is a vertical stripe pattern, the right-left divided pattern illustrated in FIG. 2(d) is selected. Further, when a pattern is a lateral stripe pattern, the up-down divided pattern illustrated in FIG. 2(e) is selected.

In the first embodiment, the LC optical rotatory plate 15 is four-divided crisscross with respect to the optical axis, but also adoptable is a structure in which each of the regions resulting from the four-division may be two-divided with respect to the optical axis so that the whole region is eight-divided, and each of the regions is independently drivable by the driving of the LC driving unit 29. This eight-divided structure makes it possible for the LC optical rotatory plate 15 to have an obliquely divided pattern, which enables the accurate distance measurement even when a subject has, for example, an oblique stripe pattern. Incidentally, the LC optical rotatory plate 15 may be structured to be divided by a division number other than four division and eight division.

Second Embodiment

Figure 4:
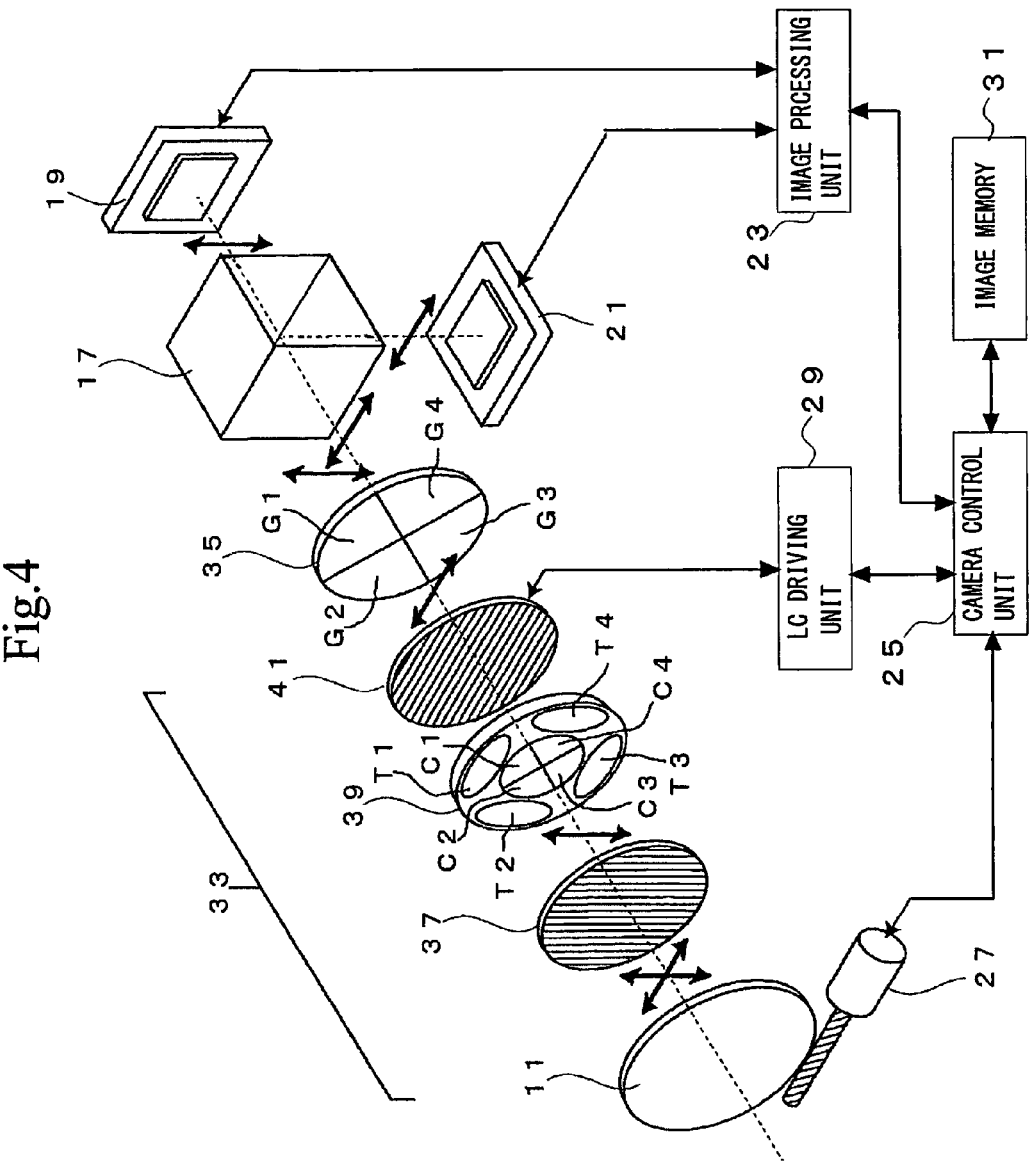
FIG. 4 is an explanatory view illustrating a second embodiment of the imaging device.

FIG. 4 illustrates a second embodiment of the distance measuring device of the present invention. In this embodiment, the present invention is applied to an imaging device being a camera. Note that, in this embodiment, the same elements as those of the first embodiment are denoted by the same reference numerals and symbols, and a detailed description thereof will be omitted.

The imaging device includes an objective lens 11, a LC shutter 33, a pupil-dividing LC optical rotatory plate 35, a polarization separation element 17, a first imaging element 19, a second imaging element 21, an image processing unit 23, a camera control unit 25, an AF driving mechanism 27, a LC driving unit 29, and an image memory 31.

At a pupil position of the objective lens 11, the LC shutter 33 is provided. The LC shutter 33 includes a first polarizing element 37, a pupil-masking LC optical rotatory plate 39, and a second polarizing element 41.

The first polarizing element 37 aligns lights from the objective lens 11 so that they have P-polarizing axes, for instance.

The pupil-masking LC optical rotatory plate 39 electrically changes the polarizing axes of the lights. The pupil-masking LC optical rotatory plate 39 is divided into regions in four directions perpendicular to one another with respect to an optical axis, depending on the distance from the optical axis. More concretely, at a center portion, center regions C1, C2, C3, C4 each having a ¼ shape of a four-divided circle are formed. In an outer peripheral part, four outer regions T1, T2, T3, T4 are formed apart from one another by a 90-degree angle. Each of the regions C1, C2, C3, C4, T1, T2, T3, T4 is independently drivable by the driving of the LC driving unit 29.

The second polarizing element 41 aligns lights from the pupil-masking LC optical rotatory plate 39 so that they have S-polarizing axes, for instance.

The pupil-dividing LC optical rotatory plate 35 is divided into four regions G1, G2, G3, G4 in a manner corresponding to the region division directions of the pupil-masking LC optical rotatory plate 39. More concretely, it is divided into four so that one of the center regions C1, C2, C3, C4 of the pupil-masking LC optical rotatory plate 39 and one of the outer regions T1, T2, T3, T4 thereof exist in each of the regions G1, G2, G3, G4.

Figure 5:
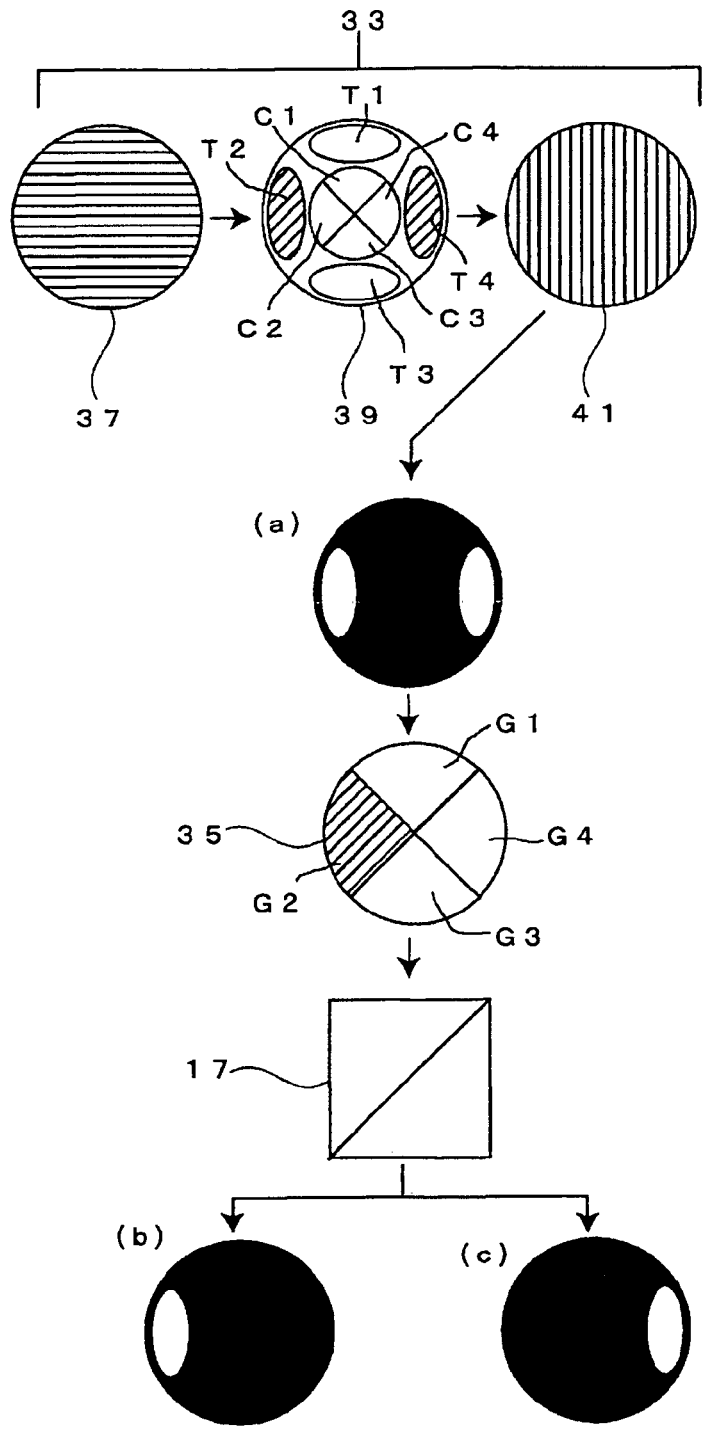
FIG. 5 is an explanatory view illustrating light shielding states of the imaging device in FIG. 4.

In the above-described imaging device, as illustrated in FIG. 5, light that has passed through the LC shutter 33 divided into the regions in the pupil masking shape is symmetrical with respect to the optical axis and a pupil of the objective lens 11 is masked.

In FIG. 5, as the first polarizing element 37, a polarizing element 13 for P-polarization is used, for instance. As the second polarizing element 41, a polarizing element 13 for S-polarization is used, for instance. Further, the control is performed so that P-polarized lights incident only on the left and right regions T2, T4 in the outer periphery of the pupil-masking LC optical rotatory plate 39 become S-polarized lights. Therefore, light beams from the objective lens 11 become as illustrated in FIG. 5(a) after passing through the LC shutter 33. That is, only lights in the left and right regions T2, T4 in the outer periphery of the pupil-masking LC optical rotatory plate 39 are transmitted through the second polarizing element 41.

Further, the control is performed so that S-polarized light incident only on the left region G2 of the pupil-dividing LC optical rotatory plate 35 becomes P-polarized Therefore, an image of the P-polarized light transmitted through the polarization separation plane 17a of the polarization separation element 17 to be imaged on the first imaging element 19 becomes as illustrated in FIG. 5(b). Only an image of the left region T2 being the P-polarized light is imaged. On the other hand, an image of the S-polarized light reflected on the polarization separation plane 17a of the polarization separation element 17 to be imaged on the second imaging element 21 becomes as illustrated in FIG. 5(c). Only an image of the right region T4 being the S-polarized light is imaged.

In the imaging device of this embodiment, the pupil-masking LC optical rotatory plate 39 and the pupil-dividing LC optical rotatory plate 35 are each divided into the plural regions and the polarizing axis of the polarized light passing through each of the regions is freely settable, which enhances a degree of freedom in setting the pupil division regions.

That is, in this embodiment, by combining driving patterns of the pupil-masking LC optical rotatory plate 39 and the pupil-dividing LC optical rotatory plate 35, it is possible to select a transmission region of the pupil in any of the patterns illustrated in FIGS. 6(a) to (d), for instance.

Figure 6:
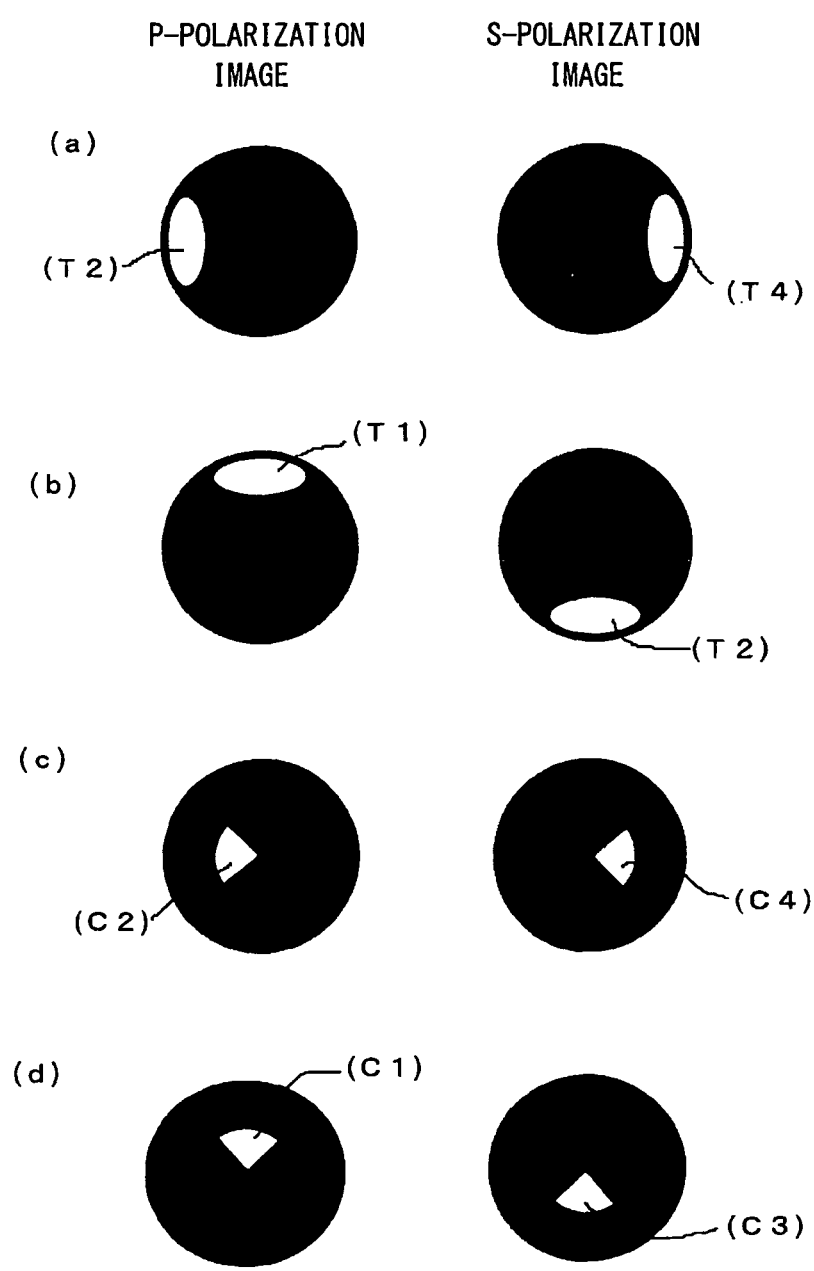
FIG. 6 are explanatory views illustrating kinds of the light shielding states of the imaging device in FIG. 4

Since the up, down, left, and right of the arrangement of the pupil and the distance of the transmission region from the optical axis can be selected, it is possible to select a more suitable state depending on a vertical or lateral pattern of a subject, an F-number of the objective lens 11, and the like. For example, when the objective lens 11 with a large aperture is used, the regions T1, T2, T3, T4 distant from the optical axis are used for the distance measurement as illustrated in FIGS. 6(a), (b). On the other hand, when the objective lens 11 with a small aperture is used, the regions C1, C2, C3, C4 close to the optical axis are used for the distance measurement as illustrated in FIGS. 6(c), (d).

Figure 7:
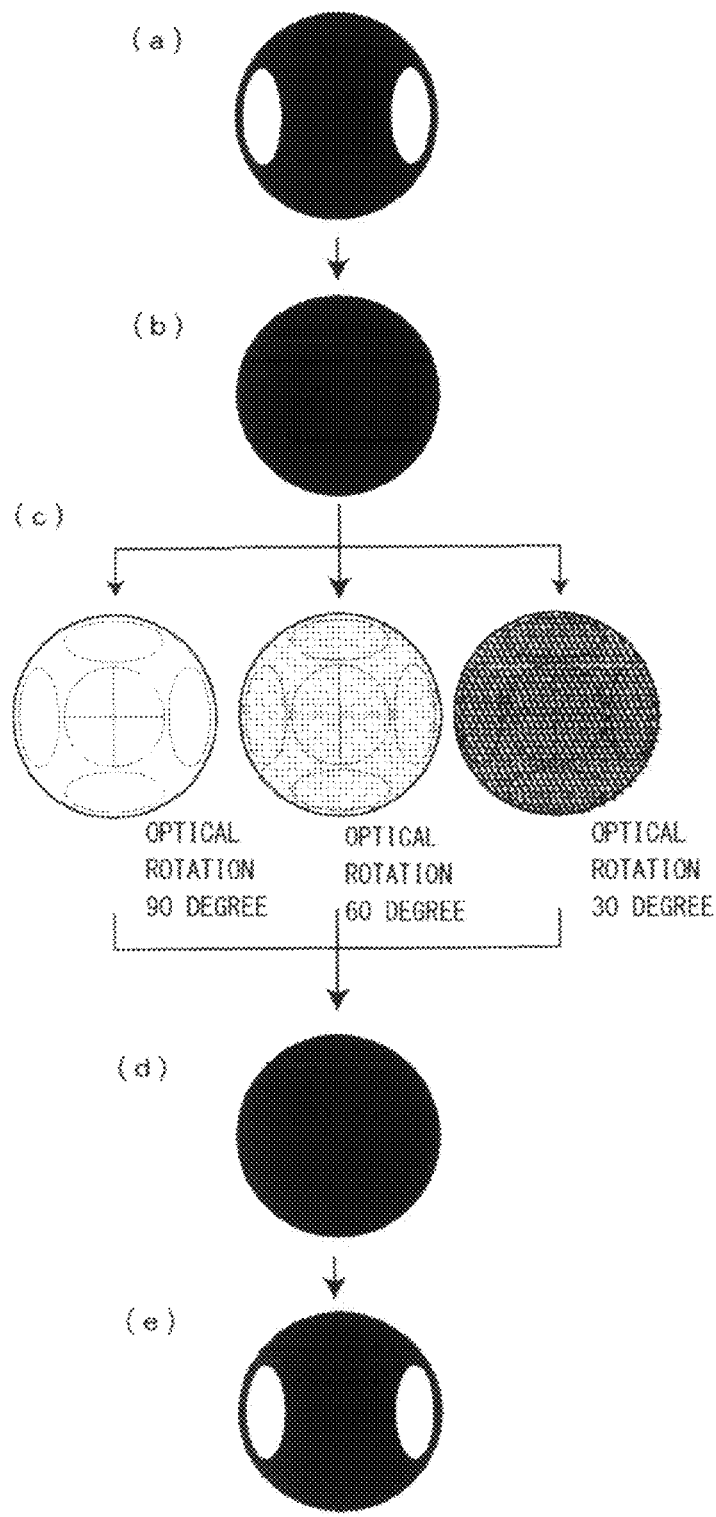
FIG. 7 are explanatory views illustrating an imaging operation of the imaging device in FIG. 4.

Further, in the imaging device of this embodiment, the pupil-masking LC optical rotatory plate 39 operates as the LC shutter 33 and an aperture as illustrated in FIG. 7, which eliminates a need to separately provide a mechanical shutter and an aperture mechanism. Specifically, being disposed at an aperture position of an optical system, the pupil-masking LC optical rotatory plate 39 interferes with the arrangement of the mechanical shutter and the aperture mechanism which are usually necessary. They can be provided substantially at the same position, but this necessitates providing a space around the aperture position, so that the position of the objective lens 11 is restricted and optical performance and the size of the optical system are restricted. In this embodiment, on the other hand, when the optical rotation on the whole surface of the pupil-masking LC optical rotatory plate 39 is set to 0, there is no light transmitted through the first polarizing element 37 and the second polarizing element 41, which makes it possible to produce a complete shield state, as illustrated in FIGS. 7(b), (d).

The flow during the photographing will be described by using FIG. 7 as follows.

Step S1: First, as illustrated in FIG. 7(a), the pupil-masking LC optical rotatory plate 39 is set to a partial optical rotatory state to form a pupil mask, and the distance measurement is performed in a distance measurement state.

Step S2: Next, as illustrated in FIG. 7(b), the complete light shield state where the optical rotation by the pupil-masking LC optical rotatory plate 39 is set to 0 is produced, to reset the imaging elements.

Step S3: Next, the optical rotation is performed on the whole surface of the pupil-masking LC optical rotatory plate 39 and exposure is performed in the whole-surface transmission state. At this time, by selecting the optical rotation by the pupil-masking LC optical rotatory plate 39 within a range of 0 to 90 degrees, it is possible to select a transmitted light amount.

Step S4: After the transmission according to the exposure time, the optical rotation on the whole surface of the pupil-masking LC optical rotatory plate 39 is again set to 0 to produce the complete shield state. In this state, the reading of the image elements is performed.

Step S5: After the reading of the imaging elements, the pupil-masking LC optical rotatory plate 39 is again brought into the partial optical rotatory state, and the distance measurement is performed.

Figure 8:
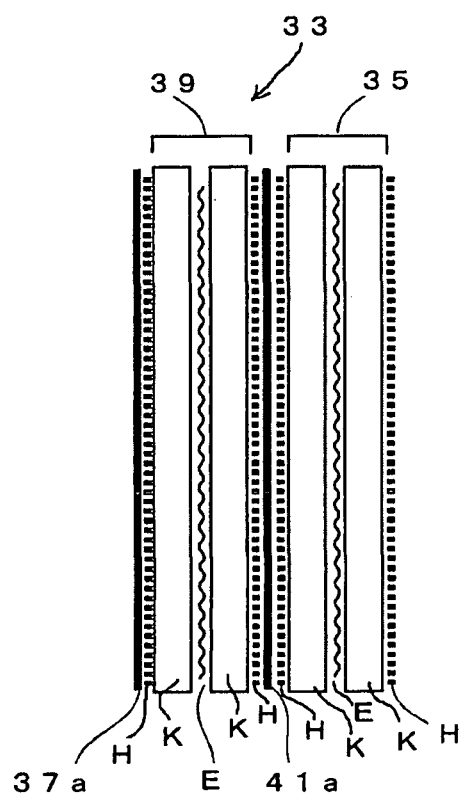
FIG. 8 is an explanatory view illustrating a state where a LC shutter and a pupil-dividing LC optical rotatory plate of the imaging device in FIG. 4 are integrally formed.

In the imaging device of this embodiment, the LC shutter 33 and the pupil-dividing LC optical rotatory plate 35 are integrated as illustrated in FIG. 8. The pupil-masking LC optical rotatory plate 39 and the pupil-dividing LC optical rotatory plate 35 are each composed of two substrates K and liquid crystal E housed therebetween. A portion between a polarizing film 37a of the first polarizing element 37 and the substrate K of the pupil-masking LC optical rotatory plate 39 is coated with an antireflection film H. A portion between the pupil-masking LC optical rotatory plate 39 and a polarizing film 41a of the second polarizing element 41 and a portion between the pupil-dividing LC optical rotatory plate 35 and the polarizing film 41a are coated with the antireflection films H. Consequently, it is possible to reduce the attenuation of a transmitted light amount due to the reflection on interfaces and reduce ghost flare. Further, since the entire structure is integrated, assembly performance can be improved.

Third Embodiment

Figure 9:
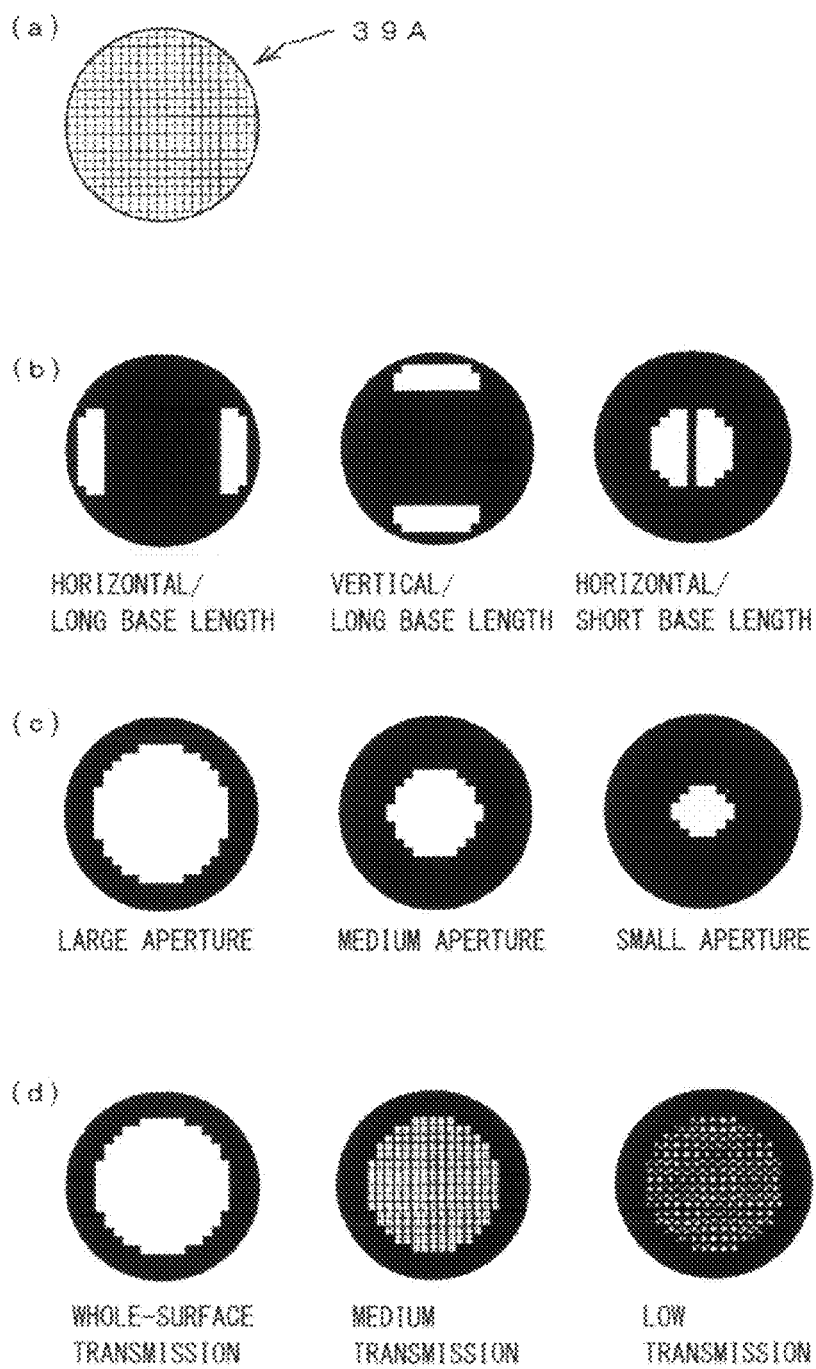
FIG. 9 are explanatory views illustrating kinds of the operation of a pupil-masking LC optical rotatory plate of a third embodiment of the imaging device.

FIG. 9 illustrate a third embodiment of the imaging device of the present invention.

In this embodiment, a drive region of a pupil-masking LC optical rotatory plate 39A is minutely divided.

In the pupil-masking LC optical rotatory plate 39A, the drive region is minutely divided as in an ordinary dot-matrix liquid crystal display, as illustrated in FIG. 9(a). By driving the minute drive regions according to the situation, it is possible to realize more functions.

(1) Transmission regions similar to simple fixed patterns as illustrated in FIG. 9(b) make it possible to realize a function as a pupil mask.

(2) At the time of the exposure, transmission regions concentric with respect to the optical axis as illustrated in FIG. 9(c) make it possible to realize a function as an aperture.

(3) By adjusting a transmission amount of the transmission region in parallel to aperture driving as illustrated in FIG. 9(d), it is possible to adjust a light amount as well as the aperture at the same time.

Since the three functions of the pupil mask, the shutter, and the aperture can be achieved, it is possible to eliminate a need for a mechanical shutter and an aperture mechanism, prevent mechanical interference, reduce the number of components, maintain a degree of design freedom, and reduce operation sound.

Fourth Embodiment

FIG. 10 illustrate a fourth embodiment of the imaging device of the present invention.

In this embodiment, the distance measuring device presented in the first embodiment is applied to re-imaging phase difference AF.

FIG. 10(a) illustrates a basic structure of the distance measuring device in the fourth embodiment. A polarizing element 13 and a LC optical rotatory plate 15 are disposed via a field lens 43 on planes optically equivalent to (conjugate with) a pupil position of an objective lens 11 in a re-imaging optics. In FIG. 10(a), the polarizing element 13 and the LC optical rotatory plate 15 are disposed between re-imaging lenses 45, 47. In this case, it is possible to obtain a pupil division effect equivalent to that obtained when the polarizing element 13 is inserted at the pupil position of the objective lens 11.

FIG. 10(b) illustrates a case where the distance measuring device illustrated in FIG. 10(a) is built in a single-lens reflex digital camera. Light beams of a subject from the objective lens 11 are reflected to a lower part of a camera body 53 by a sub mirror 51 provided behind a main mirror 49, and pass through the field lens 43, the re-imaging lens 45, the polarizing element 13, and the LC optical rotatory plate 15 in the order mentioned. The light beams that have exited from the LC optical rotatory plate 15 are folded by a mirror 55 by 90 degrees, and after passing through the re-imaging lens 47, are incident on a polarization separation element 17. Polarization components separated in the polarization separation element 17 are incident on imaging elements 19, 21 respectively. The imaging is performed by a specialized imaging element 57. Note that the reference 59 denotes a pentaprism.

Fifth Embodiment

FIG. 11 illustrate a fifth embodiment of the imaging device of the present invention.

In this embodiment, the distance measuring device presented in the second embodiment is applied to re-imaging phase difference AF.

FIG. 11(a) is a view illustrating a basic structure of the distance measuring device in the fifth embodiment, and a first polarizing element 37, a pupil-masking LC optical rotatory plate 39, a second polarizing element 41, and a pupil-dividing LC optical rotatory plate 35 are disposed on planes optically equivalent to (conjugate with) a pupil position of an objective lens 11 in a re-imaging optics. In FIG. 11(a), between re-imaging lenses 45, 47, the first polarizing element 37, the pupil-masking LC optical rotatory plate 39, the second polarizing element 41, and the pupil-dividing LC optical rotatory plate 35 are disposed. In this case, it is possible to obtain a pupil division effect equivalent to that obtained when the polarizing element 37 and so on are inserted at the pupil position of the objective lens 11.

FIG. 11(b) illustrates a case where the distance measuring device illustrated in FIG. 11(a) is built in a single-lens reflex digital camera. Light beams of a subject from the objective lens 11 are reflected to a lower part of a camera body 53 by a sub mirror 51 provided behind a main mirror 49 and pass through a field lens 43, the re-imaging lens 45, the first polarizing element 37, the pupil-masking LC optical rotatory plate 39, the second polarizing element 41, and the pupil-dividing LC optical rotatory plate 35 in the order mentioned. The light beams that have exited from the pupil-dividing LC optical rotatory plate 35 are folded by a mirror 55 by 90 degrees, and after passing through the re-imaging lens 47, are incident on a polarization separation element 17. Polarization components separated in the polarization separation element 17 are incident on imaging elements 19, 21 respectively. The imaging is performed by a specialized imaging element 57.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A distance measuring device comprising:
   a polarizing element disposed on a plane conjugate with a pupil of an objective lens;
   an optical rotary plate rotating a polarizing axis of light which has passed through the polarizing element;
   a polarization separation element separating light which has passed through the optical rotary plate into a first light beam and a second light beam;
   a first imaging element forming a first image by the first light beam;
   a second imaging element forming a second image by the second light beam; and
   a focus detector detecting a focus state based on relative deviation between the first image and the second image which correspond to a same region of a subject, wherein
   the optical rotary plate is divided into at least four regions radially with respect to an optical axis, and each of the regions is independently drivable.

2. The distance measuring device according to claim 1, wherein
   the optical rotary plate is four-divided crisscross with respect to the optical axis.

3. An imaging device comprising the distance measuring device according to claim 1.

4. A distance measuring device comprising:
   a first and a second polarizing element which are disposed on planes conjugate with a pupil of an objective lens and whose polarizing axes are perpendicular to each other;
   a first optical rotatory plate disposed between the first polarizing element and the second polarizing element to rotate a polarizing axis of light which has passed through the first polarizing element;
   a second optical rotatory plate rotating a polarizing axis of light which has passed through the second polarizing element and outputting a first light beam having a first polarization property and a second light beam having a second polarization property which is different from the first polarization property;
   a polarization separation element separating, in accordance with a polarization property, light which has passed through the second optical rotatory plate into the first light beam which has the first polarization property and the second light beam which has the second polarization property;
   a first imaging element forming a first image by the first light beam having the first polarization property;
   a second imaging element forming a second image by the second light beam having the second polarization property; and
   a focus detector detecting a focus state based on relative deviation between the first image and the second image which correspond to a same region of a subject, the first image being formed by the first light beam having the first polarization property and the second image being formed by the second light beam having the second polarization property,
   wherein the first optical rotary plate and the second optical rotary plate are each divided into at least four regions radially with respect to an optical axis, and each of the regions is independently drivable.

5. The distance measuring device according to claim 4, wherein
   the second optical rotatory plate adjusts an optical rotatory state so as to cause lights from two transmission regions of the first optical rotatory plate to have polarizing axes perpendicular to each other.

6. The distance measuring device according to claim 4, further comprising
   a mode for complete light shielding without performing an optical rotation by the first optical rotatory plate.

7. The distance measuring device according to claim 4, further comprising
   a mode to perform the optical rotation by an arbitrary angle on whole surfaces of the transmission regions.

8. The distance measuring device according to claim 4, wherein
   the first optical rotatory plate has transmission regions in a dot matrix form.

9. An imaging device comprising the distance measuring device according to claim 4.

10. The distance measuring device according to claim 4, wherein
    the polarization separation element outputs the second light beam in a direction different from that of the first light beam.

11. A distance measuring device comprising:
    a polarizing element disposed on a plane conjugate with a pupil of an objective lens;
    an optical rotary plate rotating a polarizing axis of light which has passed through the polarizing element and outputting a first light beam having a first polarization property and a second light beam having a second polarization property which is different from the first polarization property, the optical rotatory plate being divided into at least four regions radially with respect to an optical axis, and each of the regions being independently drivable;
    a polarization separation element separating, in accordance with a polarization property, light which has passed through the optical rotary plate into the first light beam which has the first polarization property and the second light beam which has the second polarization property;
    a first imaging element forming a first image by the first light beam having the first polarization property;

a second imaging element forming a second image by the second light beam having the second polarization property; and a focus detector detecting a focus state based on relative deviation between the first image and the second image which correspond to a same region of a subject, the first image being formed by the first light beam having the first polarization property and the second image being formed by the second light beam having the second polarization property.

12. The distance measuring device according to claim 11, wherein the polarization separation element outputs the second light beam in a direction different from that of the first light beam.

* * * * *